May 12, 1953

J. H. PROWINSKY 2,638,183

AUTOMATIC BRAKE

Filed June 23, 1952

INVENTOR
JOSEPH H. PROWINSKY

BY

*ATTORNEYS*

May 12, 1953  J. H. PROWINSKY  2,638,183
AUTOMATIC BRAKE

Filed June 23, 1952  3 Sheets-Sheet 2

INVENTOR
JOSEPH H. PROWINSKY
BY
ATTORNEYS

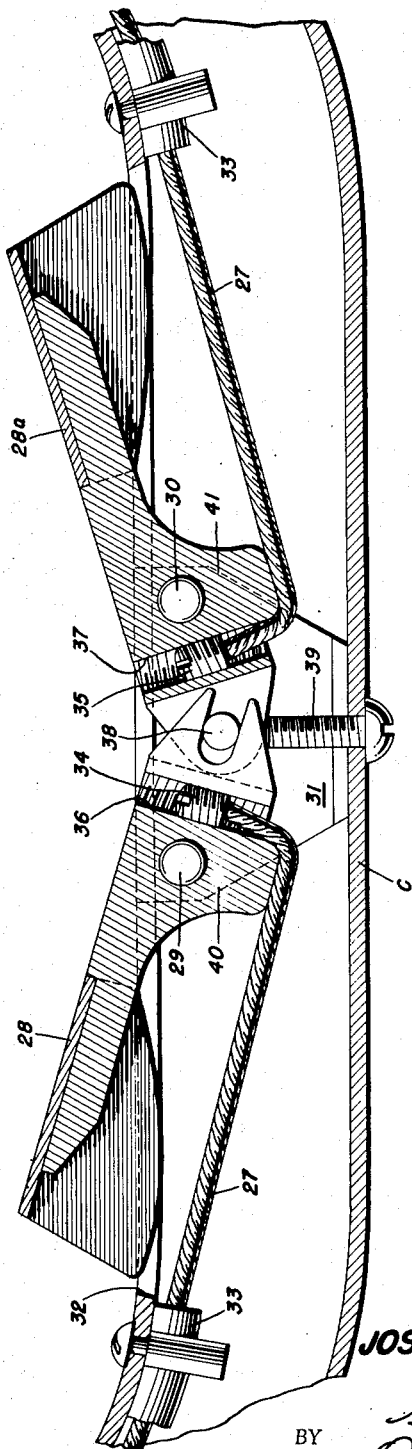

Patented May 12, 1953

2,638,183

UNITED STATES PATENT OFFICE 2,638,183

AUTOMATIC BRAKE

Joseph H. Prowinsky, Washington, D. C.

Application June 23, 1952, Serial No. 295,141

6 Claims. (Cl. 188—29)

(Granted under Title 35, U. S. Code (1952), sec. 266)

The invention described herein may be manufactured and used by or for the Government of the United States of America for governmental purposes without the payment of any royalties thereon or therefor.

This invention relates to a brake for a wheeled vehicle and more particularly and specifically to an automatic brake and wheel-lock for use on small lift trucks, hand trucks and the like where space limitations on brake installations are a primary factor. The present application is related to a prior copending application Serial No. 197,148, filed November 22, 1950, in the names of Joseph H. Prowinsky and David J. Carlson.

Hand trucks and dollies are in extensive use in the handling of cargo, supplies, ammunition and the like both on shore and aboard ship. There is a great need on vehicles of the type set forth for a brake unit which can be used as both a brake and a wheel-lock.

The primary object of the present invention resides in the provision of an automatic brake and wheel-lock for a wheeled vehicle which provides "dead man" control of a moving vehicle, braking means for reducing the speed and stopping a moving vehicle, and an automatic parking brake or wheel-lock for an unattended vehicle.

Still another object of the instant invention lies in the provision of a brake mechanism having the functional advantages previously set forth which is of an extremely simple and compact design permitting its installation in a minimum of space. The specific compact design of the subject brake unit particularly adapts the unit for simple and inexpensive installation on a wheel mount support such as a wheel bracket or wheel fork where it will be completely out of the way of other functional operations of the vehicle.

Still another and most important feature of the present invention is evidenced in the high braking force developed by the unit with respect to the maximum braking requirements of such vehicles. Additionally, the brake mechanism, being a self contained unit, permits the vehicle load to be carried directly over the wheel axle, or axles, practically eliminating any downward handle load.

A further object of the present invention resides in the provision of an automatic brake and wheel-lock unit of the character described which is of an extremely simple, inexpensive and durable design and construction as well as of simple and efficient installation.

Still another and most salient object of this invention resides in the provision of a novel and useful control means to be used in conjunction with the brake mechanism constituting the collateral component of the present invention. The control means presented provides for all those braking operations previously set forth as being of a primary advantage of the instant invention.

Still additional objects and advantages of the present invention will become readily apparent when the following description is read in the light of the accompanying drawings in which:

Figure 5 is a view in horizontal cross section of the brake control mechanism as associated with a conventional vehicle handle.

Referring now to the above drawings in greater detail wherein like designations indicate like parts throughout, A designates a vehicle wheel having a rubber or like tire thereon and B designates broadly the brake mechanism constituting the present invention. An identical brake device may be provided for each wheel of a vehicle, however a description of a single brake unit will suffice for the purposes of describing the present invention sufficiently to make manifest to any one skilled in the art the inventive concepts involved.

Figure 1:
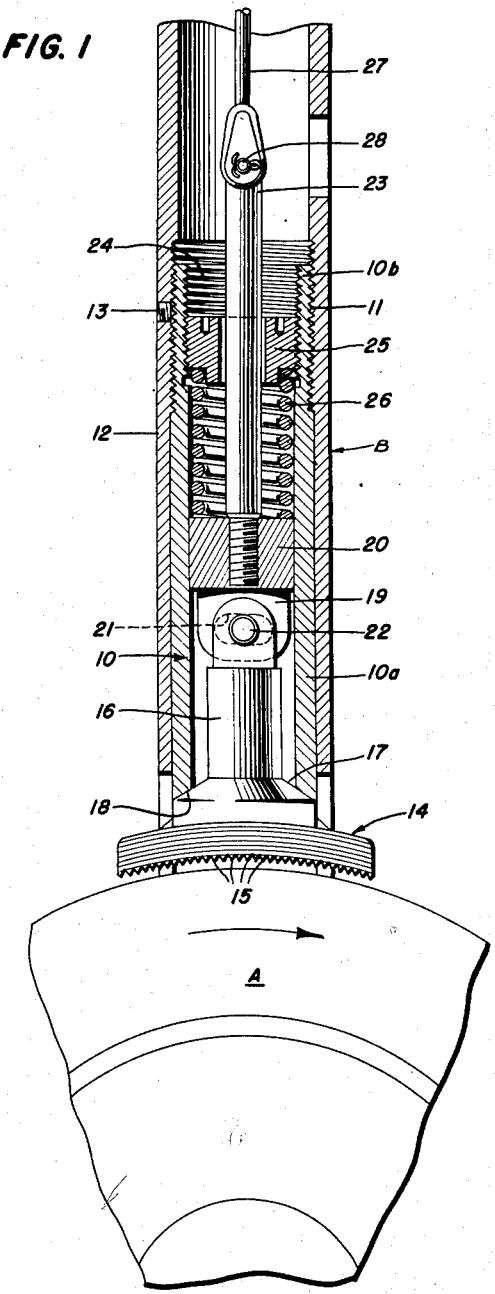
Figure 1 is a side elevation in cross section of the subject invention as applied to a vehicle wheel.
Figure 2:
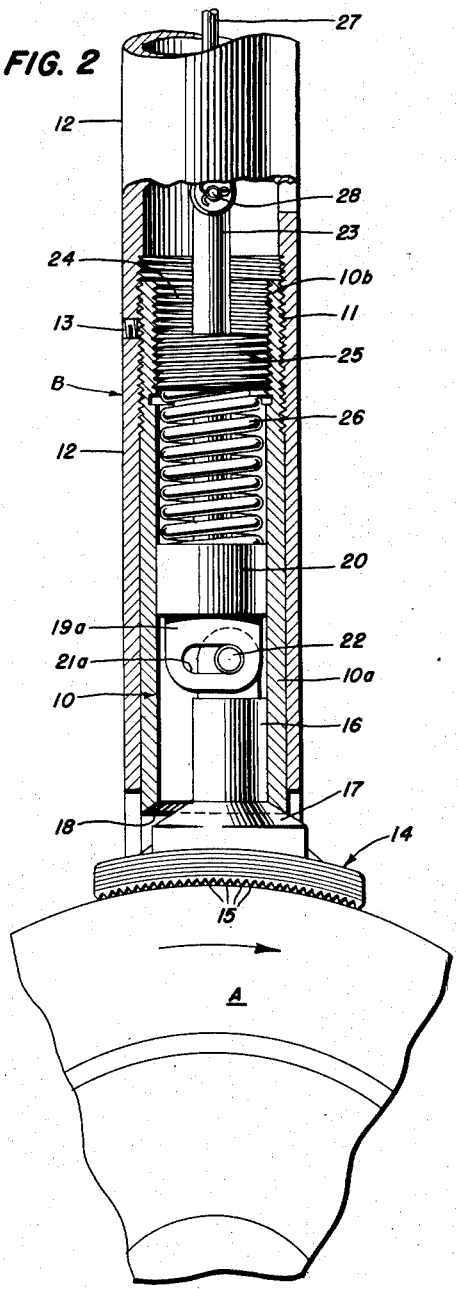
Figure 2 illustrates the device as shown in Figure 1 with the device shown in a braking position.

With reference to Figs. 1 and 2, the brake assembly operates within a cylinder 10 which is secured by external threads 11 within a tubular wheel mount post or brace member 12 typically common to most vehicles of the type for which this brake mechanism is generally intended. The threaded engagement between the cylinder 10 and the member 12 is so arranged as to locate one end of the cylinder closely adjacent to wheel A. In addition to the threaded inter-engagement between the cylinder 10 and the member 12, a set screw 13 is provided to lock the cylinder in adjusted relationship within the member 12 with respect to the wheel A.

A brake shoe 14, shaped to conform with the peripheral contour of the wheel A, and provided with serrations 15 on the wheel engaging face thereof, has secured to its opposite face, away from the wheel A, a stem 16. The outside diameter of the stem 16 is substantially smaller than the internal diameter of the cylinder 10 and that portion of the stem adjacent the shoe 14 is provided with a large tapered shoulder 17 forming a case inclined away from the shoe inwardly toward the axis of the stem. The brake shoe stem 16 extends inwardly of that end of the cylinder 10a which is adjacent the wheel A. End 10a of the cylinder is provided with an inclined face forming a tapered seat 18 having substantially the same angle of inclination as the stem shoulder 17 and is movable into engagement therewith in a manner to be hereinafter described.

That end of the stem disposed within the cylinder 10 is secured between a pair of tongue elements 19 and 19a extending from a plunger 20 which is slidably retained within the cylinder 10. These tongues 19 and 19a provided with elongated slots 21 and 21a which receive a transverse pin 22 carried by the stem. The afore-described coupling prevents independent axial movement of the stem 16 with respect to the plunger 20, but the stem remains free to move with the shoe transversely of the cylinder within the limitations of the movement of the pin 22 within the confines of the slots 21 and 21a.

An elongated shank 23 is threadedly secured in the plunger 20 and extends beyond the end 10b of the cylinder 10 where it is secured to the brake control means as will be hereinafter described.

The end 10b of the cylinder 10 is threaded internally, as at 24, to receive a threaded, tubular plug 25 which slidably receives plunger 23 axially thereof. A coil spring 26 is normally compressed within the cylinder between the plunger 20 and the threaded plug 25, and the compression of the spring is controlled by axial adjustment of the plug 25 within the cylinder.

The afore-mentioned control means constitute a flexible cable 27 secured to the extended end of the shank 23 by means of a suitable coupling, as at 28. This flexible cable normally extends to the region of the vehicle handle or handle bar where it is coupled with the manual control means shown in detail in Fig. 5 of the drawings.

In Fig. 5 of the accompanying drawings C designates a conventional hollow handle bar or handle of a wheeled vehicle. Passing from the brake mechanisms into the interior of handle C are the flexible cables 27 which in turn are secured each to one of the hand grip levers 28 or 28a.

The hand grip levers 28 and 28a are elongated lever grips which are located in end to end relationship within the handle C wherein the adjacent ends thereof are pivoted on pins 29 and 30, supported on a bracket 31 within the handle, so that the remote ends thereof are free to extend outwardly through an elongated opening 32 formed in the handle C.

The cables 27 are slidably supported in suitable guide tubings 33 secured within the handle C immediately adjacent the ends of the handle opening 32 so that the cables 27 pass closely adjacent the lever grips 28 and 28a. The ends of the cables 27 are secured in threaded plugs 34 and 35 which are threaded into tapped sockets 36 and 37 formed one in each of the adjacent ends of the grip levers 28 and 28a.

The adjacent ends of the grip levers 28 and 28a are interlocked about a pin 38 to provide for their synchronous movement, and an adjustable stud member 39 is secured in the handle to bear against the rearward faces of the adjacent ends of the lever grips to provide a limit stop for the pivotal action of the lever grips 28 and 28a.

It will be noted that the rearward faces of the inner adjacent ends of the lever grips are provided with extension elements 40 and 41 around which the cables 26 pass in surface engagement. Thereby, when one or both of the lever grips are squeezed inwardly of the handle opening 32 by the operator, the lever projections 40 and 41 exert sufficient leverage pull on the cables 27 to release the brake against the normal bias of the springs 26.

Since the brakes are normally biased to a braking position by the springs 26, it becomes manifest that an operator of the vehicle on which this brake is installed must maintain pressure on the hand grip lever means at all times while the vehicle is moving since release of the grips will automatically set the brakes. Thereby, an effective "dead man" control of the truck is achieved. This feature makes the brake particularly advantageous for use on vehicles used for transporting ammunition and explosive missiles.

It is extremely important to note at this point the novel and highly effective braking operation of the instant brake unit.

Assuming that the vehicle operator is retaining the brake control in a release position, the brake mechanism will assume the structural positioning of parts as shown in Fig. 1 wherein the plunger is retracted to compress the spring 26 and to retract the brake shoe stem inwardly of the cylinder 10. The retraction of the stem 16 causes the shoe 14 to move toward the open end of the cylinder 10, and in so moving the inclined seat 17 of the shoe sliding on the inclined face 18 about the open end of the cylinder 10 centers the stem and the shoe axially of the cylinder.

When the operator releases the brake control, to permit the automatic aspect of the brake to function, the spring 26 will force the plunger, the stem, and the brake shoe toward the wheel to bring the brake shoe into engagement with the wheel. So far, there is a braking action directly proportional in force to the value of the expansive force of the spring 26. This force is sufficient ordinarily for retarding the speed of the vehicle but it is not reliable for stopping the vehicle quickly or for holding a heavily loaded vehicle on an incline.

Accordingly, the provision has been made, as previously described, for the brake shoe and stem to move transversely of the cylinder with the stem pin 22 sliding in the slots 21 and 21a. Thus, when the brake shoe 14 has engaged the wheel periphery there will be exerted on the shoe a force tending to move it transversely of the cylinder 10 in the direction of rotation of the wheel. Such transverse movement of the stem and the shoe will bring the tapered seat 17 of the shoe into engagement with the inclined face 18 of the cylinder. Since the face 18 is inclined outwardly from the cylinder, the engagement of the inclined seat 17 with the face 18 will, with force applied axially of the cylinder by rotation of the wheel, cause the shoe to slide outwardly of the cylinder into an increased wedging, braking position between the cylinder and the wheel tire.

From the foregoing it can be seen that a very effective and superior braking action is achieved by the present brake mechanism which is capable of bringing the vehicle to an abrupt stop, and for locking the vehicle while unattended or parked.

In order for the operator to release the brake from its set position, the vehicle should be moved to rotate the wheel in a direction opposite to that in which it was rotating when the brake was set so as to substantially center the shoe and stem relative to the axis of the cylinder, and then the hand grip levers will operate, upon being squeezed inwardly of the handle, to retract the brake shoe from wheel engagement.

Figure 4:
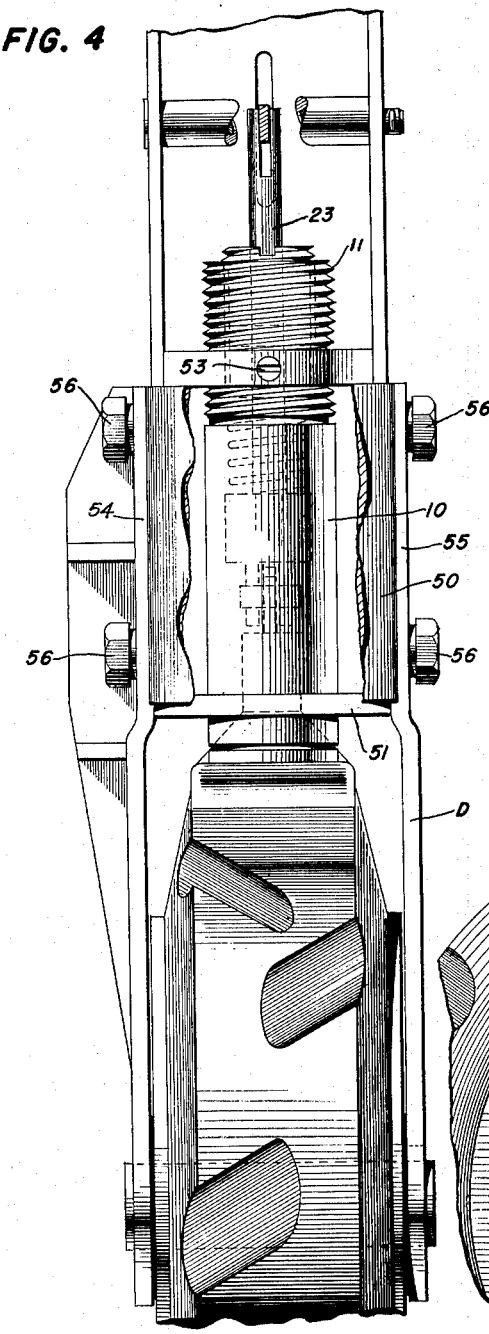
Figure 4 is view similar to Figure 3 taken at right angles to Figure 3, with portions partially broken away for purposes of clearer illustration.
Figure 3:
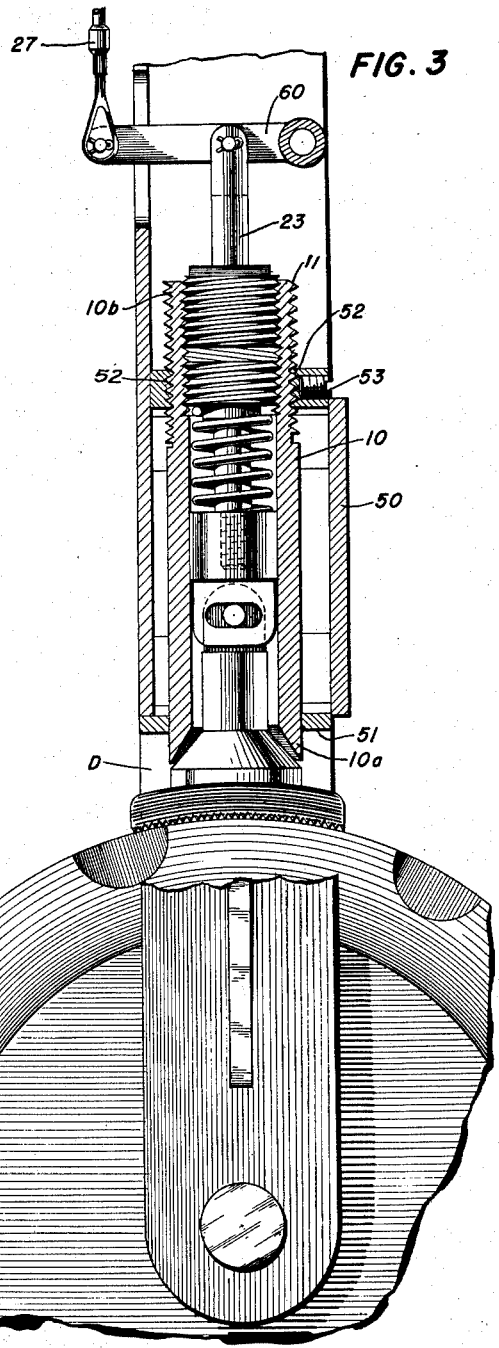
Figure 3 is a side elevation in cross section of a modified form of the subject invention.

Referring now to Figs. 3 and 4, wherein there is disclosed a modification of the brake mechanism as previously described there is shown a conventional wheel fork support for the brake as distinguished from the wheel mount or brace means 12 in the former disclosure.

In this modified form of the instant invention the cylinder 10 is secured within an elongated bushing 50 by means of a frictional throat fit at the lower end of the cylinder, as at 51, and a threaded throat at 52 threaded by receiving the external cylinder threads 11. A set screw 53 permits the locking of the cylinder 10 within the bushing 50 in longitudinally adjusted positions therein. In turn, the bushing 50 is retained within the arms 54 and 55 of a wheel fork mount D by means of plural set screws 56 carried by the arms 54 and 55.

In addition to the foregoing, there is shown in the modified disclosure of Figs. 3 and 4 a modified linkage connection between the shank 23 of the brake unit and the flexible cable 27 wherein a link bar 60 is pivoted between the fork mount arms to extend outwardly therefrom. The shank 23 is secured pivotally to this link bar at a point adjacent its pivot point and remote to the extended end thereof, while the flexible cable 27 is connected to the extended end of the link bar. Thus, any retraction of the cable 27 exerts a multiplied retraction force on the shank 23 directed toward the compression of the spring 26 by retractive movement of the plunger 20. In all other respects the disclosure of Figs. 3 and 4 duplicates that of the device shown in Figs. 1 and 2.

From the foregoing it becomes readily manifest that a novel and superior brake unit has been provided by the instant invention fully encompassing those objects and advantages previously set forth.

Obviously many modifications and variations of the present invention are possible in the light of the above teachings. It is therefore to be understood that within the scope of the appended claims the invention may be practiced otherwise than as specifically described.

What is claimed is:

1. In a brake for a wheeled vehicle having a handle portion for moving the same, a support element adjacent the wheel, a cylinder carried by the support element perpendicular to the axis of the wheel, a brake shoe designed to conform to the peripheral configuration of the wheel slidably supported in the cylinder, resilient means for normally biasing said brake shoe in an extended position from the cylinder and into engagement with the periphery of the wheel, an inclined face formed about that end of the cylinder adjacent the wheel, a second inclined face formed about the one face of the brake shoe which is forced into cooperative engagement with said first named inclined face by rotation of the wheel to thereby force the brake shoe into braking engagement with the wheel, and means on the handle portion for retracting said shoe from wheel engagement against the normal resilient bias.

2. In a brake for a wheeled vehicle having a handle portion for moving the same, a support element located adjacent the wheel, a cylinder carried by the support element in perpendicular disposition to the axis of the wheel and having one end in close proximity with the periphery of the wheel, a stem slidably supported in the cylinder a brake shoe carried on the extended end of said stem in engagement with the periphery of the wheel, resilient means for normally biasing said brake shoe in an extended position relative to the cylinder and toward the wheel, a tapered inclined face formed on the stem, a tapered seat on the cylinder engageable by the tapered stem face to tightly wedge the shoe against the wheel upon rotation of the wheel, and means on the handle portion for retracting said shoe from wheel engagement against the normal resilient bias.

3. In a brake for a wheeled vehicle having a handle portion for moving the same, a cylinder carried by a wheel supporting element in perpendicular disposition to the axis of the wheel and having one end in close proximity to the periphery thereof, a spring seated plunger in the cylinder, a stem pivotally connected to said plug and extending in axial alignment therewith toward the wheel, a brake shoe carried by said stem in braking engagement with the wheel periphery under the tension of said spring, a tapered inclined face formed on the shoe stem, a second tapered seat formed about the cylinder engageable by the tapered stem face to tightly wedge the shoe against the wheel upon rotation of the wheel, and means on the handle portion for retracting said shoe from wheel engagement.

4. In a brake for a wheeled vehicle having a handle portion for moving the same, a cylinder carried by a wheel supporting element in perpendicular disposition to the axis of the wheel and having one end in close proximity to the periphery thereof, a plunger disposed in the cylinder, spring means for resiliently biasing said plunger toward the wheel, a stem slidably housed in the cylinder and having a pin on the inner end thereof slidably secured in a transverse slot in the plunger and the outer end extending beyond the cylinder toward the wheel, a brake shoe designed to conform to the configuration of the wheel periphery, said brake shoe being rigidly secured to the outer end of said stem in braking engagement with the periphery of the wheel under the tension of said plunger spring means, a tapered inclined face formed on the stem, a second tapered seat formed about the cylinder engageable by the tapered stem face to slightly wedge the shoe against the wheel upon rotation thereof, means for adjusting the tension on the plunger spring means, and manual means on the handle portion for retracting said shoe from wheel engagement against the bias of said spring.

5. In a brake for a wheeled vehicle having a handle portion for moving the same, a support element adjacent the wheel, a cylinder carried by the support element perpendicular to the axis of the wheel, a brake shoe designed to conform to the peripheral configuration of the wheel slidably supported in the cylinder, resilient means for normally biasing said brake shoe in an extended position relative to the cylinder and into engagement with the periphery of the wheel, an inclined face formed about that end of the cylinder adjacent the wheel, a second inclined face formed about the one face of the brake shoe which is forced into cooperative braking engagement with said first named inclined face by rotation of the wheel, a hand grip lever pivotally supported on the vehicle handle, and a flexible cable interconnecting the brake shoe and the hand lever so that operation of the lever will retract the shoe from braking engagement with wheel against the resilient bias.

6. In a brake for a wheeled vehicle having a handle portion for moving the same, a support element adjacent the wheel, a cylinder carried by the support element perpendicular to the axis of the wheel, a brake shoe designed to conform to the peripheral configuration of the wheel slidably supported in the cylinder, resilient means for normally biasing said brake shoe in an extended position relative to the cylinder and into engagement with the periphery of the wheel, an inclined face formed about that end of the cylinder adjacent the wheel, a second inclined face formed about the one face of the brake shoe which is forced into cooperative braking engagement with first named inclined face by rotation of the wheel, a hand grip lever pivotally supported on the handle of the vehicle, a flexible cable interconnecting the brake shoe with said hand lever whereby the bias of the brake shoe resilient means normally retains one end of said lever in an extended position from said handle, and whereby depression of the normally extended end of said hand grip lever toward the handle will serve to retract the brake shoe from braking engagement with the wheel.

JOSEPH H. PROWINSKY.

References Cited in the file of this patent

FOREIGN PATENTS

| Number | Country | Date |
|---|---|---|
| 120,413 | Great Britain | Nov. 14, 1918 |
| 409,263 | Great Britain | Sept. 19, 1932 |